J. V. ROBINSON.
AUTOMATIC TRAIN PIPE CONNECTOR.
APPLICATION FILED APR. 7, 1914. RENEWED AUG. 3, 1917.

1,300,652.

Patented Apr. 15, 1919.

UNITED STATES PATENT OFFICE.

JOSEPH V. ROBINSON, OF CHEVY CHASE, MARYLAND.

AUTOMATIC TRAIN-PIPE CONNECTOR.

1,300,652.          Specification of Letters Patent.     Patented Apr. 15, 1919.

Application filed April 7, 1914, Serial No. 830,234. Renewed August 3, 1917. Serial No. 184,358.

*To all whom it may concern:*

Be it known that I, JOSEPH V. ROBINSON, a citizen of the United States, and resident of Chevy Chase, county of Montgomery, State of Maryland, have invented certain new and useful Improvements in Automatic Train-Pipe Connectors, of which the following is a specification.

This invention relates to automatic train pipe connectors for railway cars and has for its object to provide an improved means of renewing defective gaskets between the faces of coupled connector heads without first uncoupling the cars.

To this end the invention consists in the combinations, arrangements and constructions hereinafter described, pointed out in the appended claims and illustrated in the accompanying drawings, in which:

Figure 1:
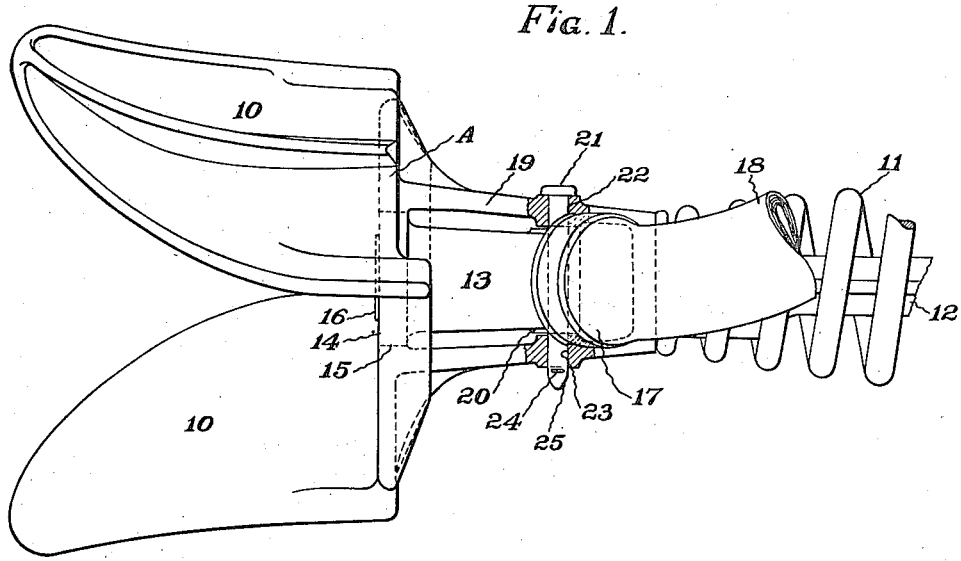
Figure 1 is a side elevation of my improved connector.
Figure 2:
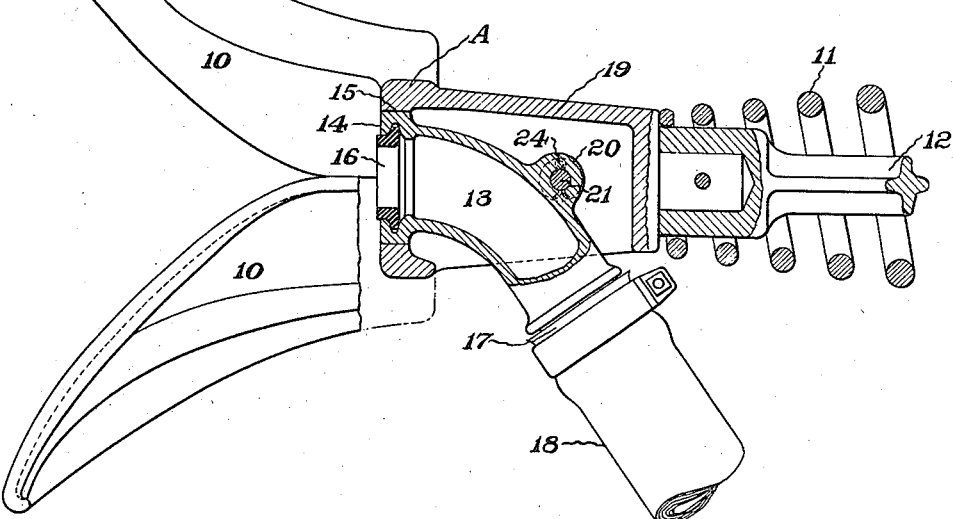
Fig. 2 is a longitudinal sectional plan view thereof.

Referring to the drawings; my invention comprises a coupling head A of any suitable type provided with suitable guiding prongs 10 for alining mating heads on curves, etc., in service. Any desired means for supporting the connector from the car and for supporting the head A for universal movement and placing it under pressure in coupling, may be used with my improvement. A satisfactory form of support is illustrated and described in my co-pending application, filed April 6, 1914, Serial Number 830,010, and I indicate such a support at 11 and 12.

More specifically, my invention consists in providing a hollow curved fluid conduit 13 which diverges laterally of said connector head at the rear thereof, and is provided with an enlarged end 14 loosely positioned in the aperture 15 of the connector head A. Said conduit serves to direct a fluid to the face of the head and carries in said enlarged end a gasket 16 of any desired material and shape preferably rubber. The face of the gasket projects slightly in advance of the face of the connector head, and the rear end of the fitting 13 is connected at 17 to the hose or pipe 18 of the car. The fitting lies within a hollow shank 19 suitably connected to the head A and is provided with a perforated boss 20 for receiving a pin 21. The pin is passed through a hole 22 in the upper wall of the hollow shank 19, down through the boss 20 of the fitting and through a hole 23 in the lower wall of the shank 19, the pin being locked in position therein by a cotter pin 24, as shown. In this manner the fitting 13 is firmly held in the service position.

To remove the fitting from the connector head A and shank 19 and renew a defective gasket without uncoupling the cars or separating coupled connector heads, the pin 21 is extracted and the fitting shifted rearwardly in the shank 19 until its enlarged end 14 leaves the aperture 15 of the connector head, whereupon it may be readily swung out of said shank and the gasket 16 removed and a new gasket inserted.

To insure that in replacing the fitting the gaskets 16 of mating connector heads will be compressed to the extent they were before the fitting was removed, the lower extremity of the pin 21 is tapered at 25 so as to force the fitting 13 forwardly in the shank 19 and aperture 15 as the pin is passed down through the said shank into the boss 20 of the fitting, thus properly compressing the gaskets.

I have illustrated a preferred construction, but changes may be made within the spirit and scope of my invention.

Having thus described my said invention, what I claim as new and desire to secure by United States Letters Patent is:

1. In an automatic train pipe connector, the combination of a connector head having an aperture and being provided also with a shank having an opening therein, a conduit extending through said opening in the shank into said aperture for directing a fluid to said head, and adapted to have its end outside of the shank connected to a train pipe, and means for holding said conduit in position in said head and opening and for permitting removal therefrom while the head is coupled up in service.

2. In an automatic train pipe connector, the combination of a coupling head provided with a face and having an aperture therein, a suitable support for said head, a hollow shank extending rearwardly from the head, a tube in said shank and aperture for directing a fluid to the head, said tube being curved laterally of the head, a flexible pipe connected to said tube, and means for maintaining the tube in said shank and aperture and for permitting removal therefrom while said head is coupled up in service.

3. In an automatic train pipe connector, the combination of a coupling head having a face and an aperture therein, a hollow shank extending rearwardly from the head, a fluid conduit having one end provided with means for engagement with a train pipe and its other end positioned in said shank and aperture and adapted to be removed therefrom while the connector head is coupled up in service, a gasket in said conduit, and manually operated means for compressing said gasket upon replacement of said conduit in said aperture after extraction therefrom.

4. In an automatic train pipe connector, the combination of a connector head having an aperture through its face and an opening through a side wall, a conduit extending through said opening and into said aperture, and a pin extending through a boss on the conduit and opposite sides of the portion of the head into which the conduit extends.

5. In an automatic train pipe connector, the combination of a connector head having an aperture through its face, a conduit having one end extending into said aperture, and a pin extending through alined apertures formed in the connector head and said conduit, to hold the conduit in position, the pin being adapted to exert a wedging action on the conduit to hold the end thereof in said aperture in the head.

In testimony whereof, I have hereunto set my hand in the presence of two witnesses.

JOSEPH V. ROBINSON.

Two witnesses:
M. H. BRAKHAGEN,
ARTHUR L. BRYANT.